US012688290B2

(12) United States Patent
Levin et al.

(10) Patent No.: US 12,688,290 B2
(45) Date of Patent: Jul. 21, 2026

(54) LOW RESOURCE NEARLINE ATTACK DETECTION

(71) Applicant: Dell Products L.P., Round Rock, TX (US)

(72) Inventors: Elik Levin, Modi'in (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/624,489

(22) Filed: Apr. 2, 2024

(65) Prior Publication Data

US 2025/0307400 A1 Oct. 2, 2025

(51) Int. Cl.
G06F 21/00 (2013.01)
G06F 21/56 (2013.01)

(52) U.S. Cl.
CPC ...... G06F 21/566 (2013.01); G06F 2221/034 (2013.01)

(58) Field of Classification Search
CPC ....................................................... G06F 21/56
See application file for complete search history.

(56) References Cited

U.S. PATENT DOCUMENTS

| | | | |
|---|---|---|---|
| 12,197,578 B1 * | 1/2025 | Brandwine | ........... G06F 21/554 |
| 12,235,961 B1 * | 2/2025 | Davies | .................. G06F 21/568 |
| 2016/0241573 A1 * | 8/2016 | Mixer | ..................... G06F 21/53 |
| 2024/0111863 A1 * | 4/2024 | Don | ...................... G06F 21/565 |
| 2024/0320340 A1 * | 9/2024 | Vt | .......................... G06F 21/565 |
| 2024/0330447 A1 * | 10/2024 | Ezrielev | ............... G06F 21/554 |

FOREIGN PATENT DOCUMENTS

| CA | 2789824 A1 * | 10/2011 | ........... G06F 21/564 |
|---|---|---|---|

* cited by examiner

*Primary Examiner* — Tri M Tran
(74) *Attorney, Agent, or Firm* — Workman Nydegger

(57) ABSTRACT

Techniques for detecting security issues in a storage array are disclosed. A service receives, from a host, an indication of compromise (IOC) reflecting that the host is suspected of being compromised. In response, the service refrains from turning on inline IO checking. In lieu of turning on the inline IO checking, the service triggers monitoring of previous snapshots stored on a specific storage device in the array to detect a trail of a possible attack. The service provides a notification to a centralized security system of the possible attack on the specific storage device. The notification is structured to operate as a triggering mechanism to cause the centralized security system to identify a second storage array that is in communication with the host and to further cause the centralized security system to instruct the second storage array to search for a second possible attack on the second storage array.

20 Claims, 3 Drawing Sheets

200

Architecture
100

Cloud
110

Host
115

Service
105

IOC
125

IO
150

Storage Array
145

Device
145A

Device
145B

Device
145C

Device
145D

Centralized
Security System
140

Storage Management
Station
130

Storage Array
120

Device
120B

Device
120C

Device
120D

Device
120E

Vector(s)
135

200

Receive, At A Storage Array And From A Host, An IOC Reflecting That The Host Is Suspected Of Being Compromised
205

Refrain From Turning On IO Checking
210

Trigger Monitoring Of Previous Snapshots To Detect A Trail Of A Possible Attack
215

Provide A Notification To A Centralized Security System Of The Possible Attack On The Specific Storage Device
220

LOW RESOURCE NEARLINE ATTACK DETECTION

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

Embodiments of the present invention generally relate to detecting security vulnerabilities in a storage array. More particularly, at least some embodiments of the invention relate to systems, hardware, software, computer-readable media, and methods for intelligently detecting vulnerabilities by analyzing previous snapshots to detect an attack.

BACKGROUND

The phrase "nearline" storage refers to on-site storage of data using removable media. The term "nearline" is a combination of the terms "near" and "online." Nearline storage devices include, but certainly are not limited to, high density optical disk devices, magnetic disk devices, and magnetic tape devices.

Nearline storage refers to a technique of storing data that straddles the line between long term data archival and readily available online data storage. For instance, it is typically the case that data stored in nearline systems is not required to be readily available or perhaps even redundantly stored. Often, the data stored in nearline systems is accessed only occasionally. As a result, nearline systems often rely on the use of relatively inexpensive disk storage.

In contrast, online storage refers to a storage technique that provides ready access to data that is frequently used. Often, multiple users access this data, sometimes in a simultaneous manner. Archival storage refers to a storage technique that is typically offline. Often, this data is rarely accessed. As a result, nearline storage can be viewed as an intermediary between online storage and archival storage.

It is typically the case that nearline storage devices are not directly attached to a computer. For instance, nearline systems often include an array of removable storage devices that are managed by a management service system. As one example, a nearline system may include an unmounted solid state drive (SSD) that can be mounted so as to access its storage features.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
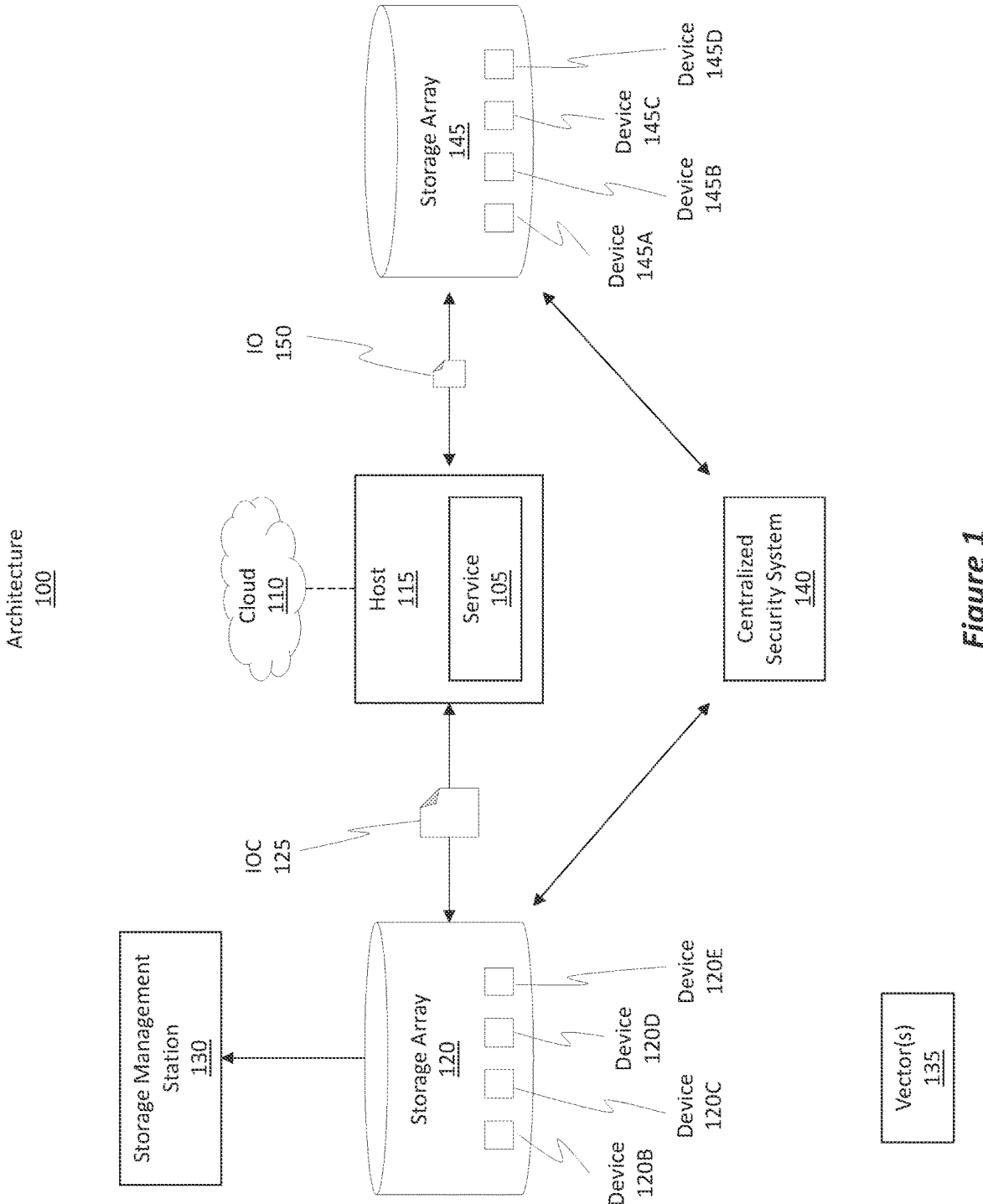
FIG. 1 discloses aspects of a computing architecture that is configured to detect security vulnerabilities.

Storage systems, including nearline storage systems, are often subject to attacks. Many of the storage-based nearline attack detection techniques rely on having considerable storage array computational resources to detect attacks. One reason for the considerable resources is the need to monitor considerable amounts of input/output (IO) coming to a storage array from many servers to detect attacks. Although many of the examples recited herein are described in the context of nearline systems, it should be appreciated how the disclosed principles can be employed for any type of storage system, including online storage and archival storage.

Some of the detection methods referenced above include monitoring various vectors, such as a "read/write rate," "device IO address dispersion," and "IO size changes," among others. The read/write vector describes the number of reads or writes that occur on a storage device. Some attacks are structured to increase the read and/or write rate. Regarding the device IO address dispersion vector, some databases write to an ever increasing address block on a device. A write to a previously written area (as opposed to a new area) may be abnormal and may indicate an attack. The device IO address dispersion vector is able to track where data is being written. Regarding the IO size changes, this vector tracks the size of IO. For instance, if an IO for a device is typically around 8 KB, but a drastically different sized IO occurs, it may be a sign of an attack. These vectors are but a small number of vectors that may be tracked. Accordingly it will be appreciated how the disclosed embodiments can be implemented with respect to any type of vector.

Monitoring a device's IO characteristics is often a useful approach to detect an attack. Notably, however, monitoring IO characteristics often comes at a considerable cost to the storage array's resources, both in terms of computational resources and storage resources.

Another, less resource hungry vector that may be monitored is the "uncompressed data rate/percent" of a storage array. For instance, consider a scenario where ransomware is encrypting data, and the non-encrypted data was compressible and/or de-dupable. When an attack is ongoing, such as in a scenario where previously compressible data is now being encrypted, the percentage or amount of uncompressed data will grow. This growth can serve as an indication of an attack. Administrators typically monitor multiple vectors in an effort to detect attacks. This multi-faceted strategy often puts a strain on the storage array's resources.

Other attack detection methodologies also exist, such as using host software (e.g., an anti-virus software) that attempts to detect ransomware attacks on a host. As used herein, the term "host" may refer to a user's computer (e.g., a PC) that is connected to a removable storage device, such as an external storage drive (e.g., a storage array). The term "server," as used herein, is another example of a "host." Therefore, as used herein, the terms "host" and "server" can be used interchangeably. A host can also be a mainframe host because the host can be, but need not be, an open system server. Thus, in various implementations, a host can be a personal computer, any type of server, or any type of mainframe. In the earlier example, the anti-virus software runs on the host and attempts to detect malicious software on the host.

Historically, once such an attack is detected on the host, an IOC (indication of compromise) is reported to the user of the host or perhaps to an administrator. An "IOC" is a term used to describe information that has been detected as a part of a scan, where that information indicates the potential presence of an attack. For instance, the IOC can refer to information describing a potential security issue. Often, the IOC identifies the name of the application that is suspected of having an issue and further identifies what the potential issue is. The IOC can also identify the name of the host.

An example will be helpful. Suppose an anti-virus software detects a malicious application on one computer system (i.e. a host). The anti-virus software will raise an IOC and report that to a user or perhaps to a security service. It may be the case that other computer systems are also executing the same application, but the anti-virus software on those other computer systems are out of date and have not detected the malicious application. Using the IOC as a reference, the malicious application on the other computer systems can be identified and removed (e.g., perhaps by the security service or the administrator).

Although various techniques exist to detect attacks, there is an ongoing need to improve how attacks against storage systems are detected. In particular, solutions are needed to provide accurate and low cost (e.g., in terms of resource consumption) techniques to detect attacks and security vulnerabilities.

The disclosed embodiments provide solutions to those needs. In particular, the disclosed embodiments bring about numerous benefits, advantages, and practical applications to the technical field of storage attack detection. Beneficially, the disclosed embodiments reduce the amount of resources needed to identify an attack while still providing high success rates in detecting such attacks. As a result, the disclosed embodiments enhance computer security and integrity.

As another advantage, the embodiments can avoid turning on inline attack detection for all vectors. This avoidance lowers the resources the storage array uses to detect attacks. Also, the disclosed operations can be performed in an offline manner and as a background process, which also helps to lower resource utilization. Accordingly, these and numerous other benefits will now be described in more detail throughout the remaining portions of this disclosure.

Example Architecture

Attention will now be directed to FIG. 1, which illustrates an example architecture 100 in which the disclosed principles may be employed. Architecture 100 shows a service 105 and a storage management station 130 (which is also a "service").

As used herein, the term "service" refers to an automated program that is tasked with performing different actions based on input. In some cases, service 105 (and storage management station 130) can be a deterministic service that operates fully given a set of inputs and without a randomization factor. In other cases, service 105 (and storage management station 130) can be or can include a machine learning (ML) or artificial intelligence engine. The ML engine enables service 105 (and storage management station 130) to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 (and storage management station 130) is a cloud service operating in a cloud environment 110. In some implementations, service 105 (and storage management station 130) is a local service operating on a local device. In some implementations, service 105 (and storage management station 130) is a hybrid service that includes a cloud component operating in the cloud and a local component operating on a local device. These two components can communicate with one another. In some cases, service 105 (and storage management station 130) can operate in a virtualized environment, such as a virtual machine or a container. Thus, in some cases, service 105 (and storage management station 130) operates in a cloud based environment and in other cases service 105 (and storage management station 130) operates in a virtualized environment.

FIG. 1 shows how service 105 can be implemented on the host 115, which can communicate with a storage array 120, which may include any number of storage array devices, such as devices 120A, 120B, 120C, and 120D. Storage management station 130 is the software that controls the various devices 120A, 120B, 120C, and 120D of the storage array 120. Thus, the storage array 120 includes various hardware and software components.

It is desirable to be able to notify the hardware/software on the storage array 120 that is managing the storage array devices 120A, 120B, 120C, and 120D (e.g., notify storage management station 130). Thus, it should be noted how the storage array 120 is not just a compilation of hardware (e.g., the devices 120A, 120B, 120C, and 120D), but rather, the storage array 120 is a combination of hardware and software that manages the various storage devices. Stated differently, it is desirable to notify the software application (e.g., storage management station 130) that manages the devices when a host (e.g., host 115), which stores data on the devices of the storage array 120, is compromised.

Returning to service 105, service 105 is generally structured to detect attacks in the host 115 and to then notify the storage array 120 of these attacks. That is, part of the disclosed solution(s) is an improved technique for enabling the host 115 to report an IOC 125 to the storage array 120.

As various examples, the IOC 125 may be or may include any one or more of the following commands: a log select command, a new vendor unique SCSI command, and so on. These commands are how the host 115 is able to communicate with storage array 120 through read and write commands. Additionally, host 115 can communicate with storage array 120 using management commands, inquiries, tests, unit ready messages, read commands, write commands, capacity commands, and so on. Beneficially, host 115 is able to communicate a plethora of information to the storage array 120 in a variety of ways.

One feature of the disclosed embodiments relates to the ability for the host 115 to now communicate the IOC 125 to a specific storage array device (e.g., any one of the devices 120A, 120B, 120C, and 120D). That storage array device will then send the IOC to the storage management station 130 for the storage array 120. Thus, in accordance with the disclosed principles, the host 115 now no longer sends the IOC 125 to the storage management station 130; instead, the host 115 sends the IOC 125 to a specific storage array device (e.g., device 120A), and the storage array device 120A then sends the IOC 125 to the storage management station 130. To enhance security, the host 115 is not connected to the storage management station 130; thus, the host 115 cannot send the IOC 125 directly to the storage management station 130.

Previously, when an issue was detected, the host (aka server) would send an alert either to a user's email or to a server management console. Previously, the storage array was not notified of the IOC.

It may be the case that the host 115 is connected to multiple storage array devices. In such situations, the host 115 sends the IOC 125 to a single one of the connected storage array devices. The storage array 120 is aware of which devices are accessed by which host. As a result, it is not necessary for the host 115 to send the IOC 125 to multiple storage array devices.

As an example, suppose host 115 is connected to 10 storage array devices. The storage array 120 is aware that these 10 storage array devices are connected to host 115. Host 115 sends the IOC 125 to a single one of the 10 storage array devices, and the storage array 120 can automatically recognize that 10 total storage array devices might be impacted because they are all connected to the host 115. The selection of which specific storage array device to send the IOC to is arbitrary, and any of the connected storage array devices may be selected.

Accordingly, host 115 (via service 105) will report the IOC 125 to a specific storage array device that, due to its connection to the host 115, is suspected as being compromised. The storage array 120 will monitor one or more lower-resource vector(s) 135 in a continuous, near-continuous, or at least high frequency manner. Examples of various lower-resource vector(s) 135 include, but are not limited to, the uncompressed data rate, the write IO sizes, or IOCs reporting from the host 115. In this regard, the storage array 120 refrains from monitoring all vectors and instead monitors only a limited subset of the vectors, such as perhaps 1, 2, 3, 4, or 5. Typically, the number of monitored vectors is less than 5. Often, the number of monitored vectors is 1 or 2.

If the monitored vector(s) 135 show signs of an attack, the storage array will not turn on an inline IO checking process using all possible vectors. The storage array 120 instead refrains from checking all possible vectors because such an approach is very resource heavy and may impact the storage array's ability to process IOs. Examples of signs of an attack include, but are not limited to, situations in which write IO sizes fluctuate from a previously constant size or a situation in which a host reported detection of an IOC.

Instead of inline inspecting the incoming commands or data (after suspicion of a compromise), the storage array 120 will inspect previous snapshots (i.e. copies of the device) of the suspected devices' data in an attempt to detect trails or breadcrumbs of a possible attack. As an example, consider a scenario where a device stores a database. A backup or snapshot of this database may be created every select number of minutes. Typically, the snapshot does not include a full copy of the database; rather, the snapshot includes deltas or changes that have transpired over the given time-frame relative to the previous snapshot. Therefore, instead of turning on inline testing, the disclosed embodiments begin to test the previous snapshots of the storage array devices to search for signs of a compromised device.

There are various techniques to search for signs of a compromised device using device snapshots. As some non-limiting examples, signs of compromise include, but are not limited to, a data change rate between snapshots not being normal for a given device (i.e. abnormalities are detected) or data-spans that are changed are not normal (e.g., it may be the case that the normal process involves new data being written at the end of the device, but a change has occurred between snapshots and now new writes are being written to the middle memory locations of the device).

As another example, if data historically changed at a rate of 1% but then the data rate changed to 15%, that change may be an indication of a malware attack on the host because the host is now writing more data than normal. Thus, the embodiments are able to indirectly identify a malware attack on a host by examining the snapshots that have been stored for that host on a remote storage device.

As another example, it may be the case that between snapshot one and snapshot two, 10 kilobytes of data was added at the end of the storage array device. Similarly, between snapshot two and snapshot three, 10 kilobytes were added at the end of the device. Then, however, between snapshot three and snapshot four, 100 megabytes were added in a middle address space for the device. Such a divergence from the pattern may indicate the presence of an attack.

The disclosed embodiments are able to track and monitor these patterns and detect deviations from the established patterns to determine whether an attack is happening on a host. That is, the embodiments are able to analyze any number of past snapshots for a device and detect a pattern within those snapshots. If a later snapshot shows a divergence from the pattern, the embodiments can determine that the divergence may be a sign of an attack. In this regard, the embodiments are able to analyze remotely stored data to determine whether a host is being attacked.

Beneficially, the process of examining snapshots can be performed as a background operation. As a result, load on the storage array's resources will be lower and will be performed in a scheduled, or pre-planned, manner. However, slower snapshot data examination may defer or delay the malware detection. Hence, the embodiments provide the option to adjust the level of aggressiveness by which the examination occurs. For instance, when the level of aggressiveness is set to a lower level, the amount of time it may take to detect the attack may be longer. In contrast, when the level of aggressiveness is set to a high level, the amount of time it may take to detect the attack may be shorter.

As another example, consider a scenario where the aggressiveness is set to a low value, such as perhaps checking one snapshot per day (or some other time period). At this rate, it may take some time before a deviation from the pattern is detected. On that other hand, if the aggressiveness is set to a high value, such as perhaps checking one snapshot every five minutes (or some other time period), then it will take considerably less time to detect the deviation.

The aggressiveness can be dynamically modified during different parts of a day. For instance, during normal working hours, the aggressiveness may be set to a lower value because of an increased demand of the storage array. During the nighttime hours, however, when less people are working (and hence a lower demand), the aggressiveness level may be increased. Thus, the aggressiveness can be tailored based on an expected or actual load on the storage array.

In fact, the current load of the storage array can be dynamically monitored. If the load is low, the aggressiveness may be set to a high value. If the load changes and becomes high, the aggressiveness may automatically change to a low value. With inline testing, that testing is committed to being performed even if the storage unit is currently busy.

In addition, the storage array 120 will also notify the centralized security system 140 of the possible attack on the impacted devices. Using information obtained from the storage array device suspected of being compromised, the centralized security system 140 can also determine the name of the host 115 that reported the IOC to the storage array device.

The centralized security system 140 will query other storage arrays (e.g., storage array 145, which includes storage array devices 145A, 145B, 145C, and 145D) for the names of hosts issuing IOs to those other storage array (e.g., it may be the cast that the compromised host 115 is also communicating with storage array 145). Additionally, or alternatively, the embodiments can generate or obtain a connectivity map from a centralized management entity to identify these other storage arrays.

If the same host 115 is also sending IOs to the storage array 145, as shown by IO 150, then it is beneficial to learn of that situation so the embodiments can determine whether the storage array 145 is also potentially compromised due to its communications with the host 115. Additionally, or alternatively, the data on the storage array 145 can also be analyzed to determine whether the host 115 is compromised. For instance, analyzing the data on storage array 120 might not reveal a potential threat, but analyzing the data on storage array 145 might successfully reveal the potential threat. Thus, multiple remote sources can be analyzed to determine whether host 115 is compromised.

If the storage array 145 is an older storage array 145, it might be the case that it does not have adequate automatic detection measures in place to detect the potential comprise. In such a scenario, it is particularly beneficial to inform the storage array 145 of the compromised host 115 so adequate security measures can be taken.

Storage array 120 is able to detect the suspicious pattern behavior based on the analysis of its snapshots and then provide an alert to the centralized security system 140. The centralized security system 140 can then determine what other storage arrays host 115 is communicating with, and centralized security system 140 can then alert those other storage arrays and/or perform security measures.

Stated differently, centralized security system 140 will identify whether the suspected host 115 (issuing IOC or IO to storage array 120) is also using other storage arrays (e.g., storage array 145) to which IOCs have not arrived or are not capable of malware detection. These other storage arrays (e.g., storage array 145) will be instructed by the centralized security system 140 to search for attack signs on their existing snapshots.

Thus, the embodiments avoid turning on inline attack detection for all vectors and instead check or analyze only a select number of limited vectors to determine whether potential signs of attack exist. If a potential sign exists, the embodiments can then trigger the analysis on the device's snapshots. Analyzing the snapshots can help determine when and how a host (or even the storage array itself) is compromised.

Performing these operations beneficially lowers the resources the storage array invests in to perform these detection operations. Searching for ransomware signs in snapshots in response to an IOC is an offline operation and can be done in the background, thus using lower resources. It should be noted how the attack might not be stopped immediately, but it will be detected. However, regarding of when the attack is detected, the embodiments can revert back to an older snapshot to recover the host 115.

Accordingly, if the embodiments detect malware or a suspicion of malware on a device that includes snapshot data, then the embodiments are able to identify all of the other storage devices that a host is communicating with. The embodiments can then inform those other devices, or rather the software that is managing those devices, of the potential that they have compromised data.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
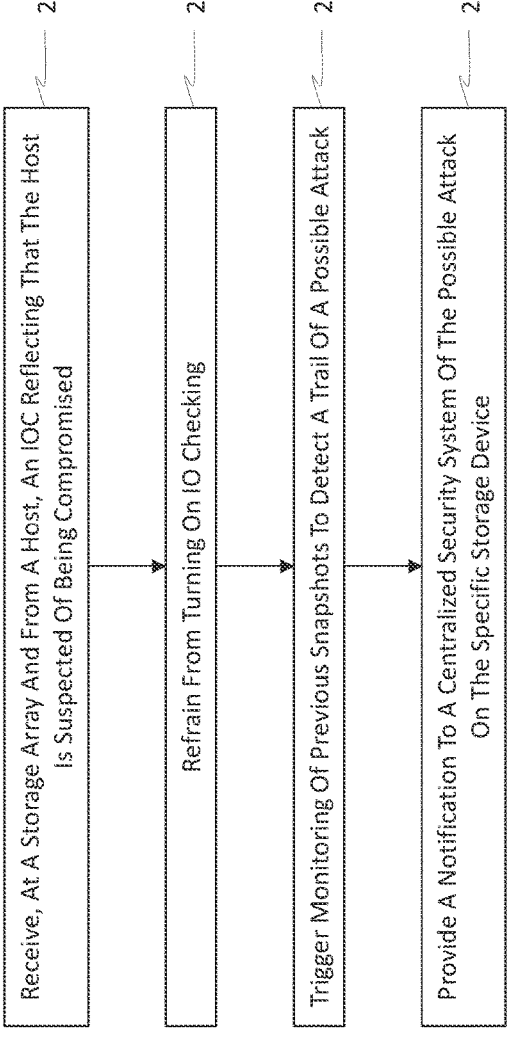
FIG. 2 discloses aspects of a flowchart of an example method for detecting vulnerabilities.

Attention will now be directed to FIG. 2, which illustrates a flowchart of an example method 200 for monitoring snapshot data in an attempt to detect an attack. Method 200 can be implemented within the architecture 100 of FIG. 1 and by the storage array 120 (e.g., perhaps by the storage management station 130).

Method 200 includes an act (act 205) of receiving, at a storage array and from a host, an indication of compromise (IOC). This IOC reflects that the host is suspected of being compromised. The IOC is received at a specific storage device included in the storage array.

In response to receiving the IOC, act 210 includes refraining from turning on inline input/output (IO) checking using all vectors in a set of vectors. This act includes refraining from checking incoming IO at the device. In some scenarios, the set of vectors includes one or more of an uncompressed data rate, a write IO size, or IOCs that have been reported from the host.

In lieu of turning on the inline IO checking, act 215 includes triggering monitoring of previous snapshots stored on the specific storage device. This monitoring is performed in an attempt to detect a trail of a possible attack. In some cases, monitoring the previous snapshots includes determining a pattern of behavior for the specific storage device. Detecting the trail of the possible attack includes identifying a deviation from the determined pattern of behavior for the specific storage device. Detecting the trail of the possible attack using the previous snapshots includes identifying a situation in which a data change rate between snapshots deviates from an established pattern. Preferably, monitoring the previous snapshots is performed as a background process and is performed as an offline process. This act involving turning on low-resource monitoring to leverage snapshots, but any other low-level detection method can be used.

In some implementations, monitoring the previous snapshots is performed based on a designated aggressiveness level. The aggressiveness level can be one of a low level, a medium level, or a high level. When the high level is used, at least a select number of snapshots are monitored every select number of minutes. When the low level is used, at least one snapshot is monitored every 24 hour time period.

In some cases, in response to receiving the IOC, the embodiments cause the storage array to monitor a limited subset of the vectors. Based on monitoring the limited subset of the vectors, the embodiments identify a potential sign of the possible attack. Then, in response to identifying the potential sign of the possible attack, the embodiments trigger the monitoring of the previous snapshots.

Act 220 includes providing a notification to a centralized security system of the possible attack on the specific storage device. Notably, the notification is structured to operate as a triggering mechanism to cause the centralized security system to identify a second storage array that is in communication with the host. The notification is further structured to cause the centralized security system to instruct the second storage array to search for a second possible attack on the second storage array.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
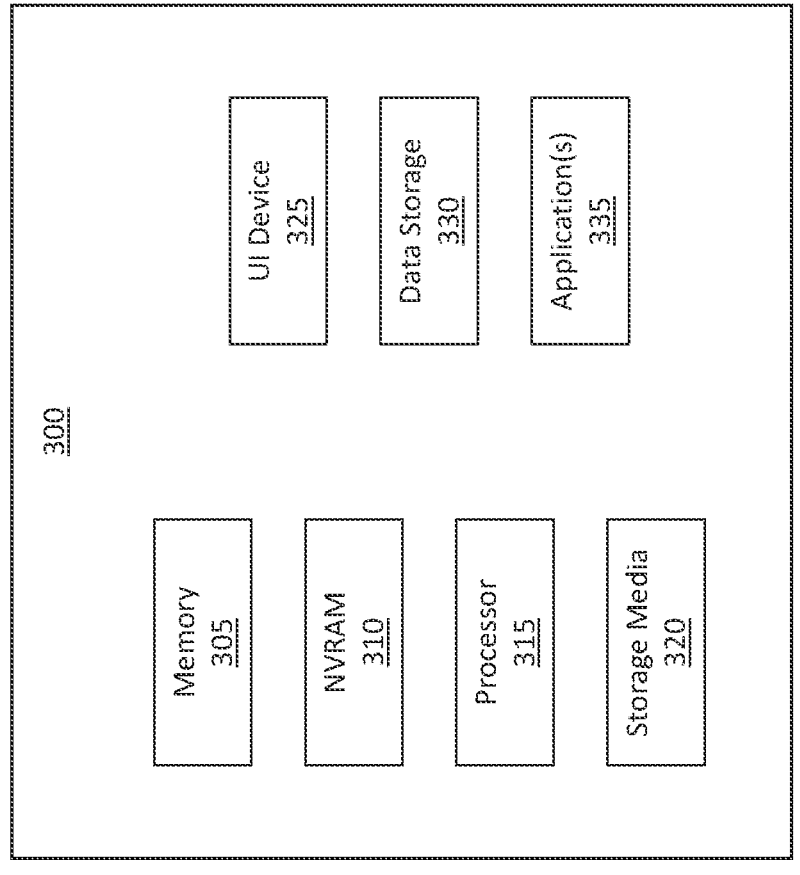
FIG. 3 discloses aspects of an example computer system that can be configured to perform any of the disclosed operations.

With reference briefly now to FIG. 3, any one or more of the entities disclosed, or implied, by the Figures and/or elsewhere herein, may take the form of, or include, or be implemented on, or hosted by, a physical computing device, one example of which is denoted at 300. Also, where any of the aforementioned elements comprise or consist of a virtual machine (VM), that VM may constitute a virtualization of any combination of the physical components disclosed in FIG. 3.

In the example of FIG. 3, the physical computing device 300 includes a memory 305 which may include one, some, or all, of random access memory (RAM), non-volatile memory (NVM) 310 such as NVRAM for example, read-only memory (ROM), and persistent memory, one or more hardware processors 315, non-transitory storage media 320, UI device 325, and data storage 330. One or more of the memory 305 of the physical computing device 300 may take the form of solid-state device (SSD) storage. Also, one or more applications 335 may be provided that comprise instructions executable by one or more hardware processors 315 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 300 may also be representative of an edge system, a cloud-based system, a datacenter or portion thereof, or other system or entity.

The disclosed embodiments can be implemented in numerous different ways, as described in the various different clauses recited below.

Clause 1. A method comprising: receiving, at a storage array and from a host, an indication of compromise (IOC) reflecting that the host is suspected of being compromised, wherein the IOC is received at a specific storage device included in the storage array; in response to receiving the IOC, refraining from turning on inline input/output (IO) checking using all vectors in a set of vectors, including refraining from checking incoming IO; in lieu of turning on the inline IO checking, triggering monitoring of previous snapshots stored on the specific storage device to detect a trail of a possible attack; and providing a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second possible attack reflected by snapshots stored on the second storage array.

Clause 2. The method of the preceding clauses, wherein the set of vectors includes an uncompressed data rate.

Clause 3. The method of the preceding clauses, wherein the set of vectors includes a write IO size.

Clause 4. The method of the preceding clauses, wherein the set of vectors includes IOCs that have been reported from the host.

Clause 5. The method of the preceding clauses, wherein monitoring the previous snapshots includes determining a pattern of behavior for the specific storage device.

Clause 6. The method of the preceding clauses, wherein detecting the trail of the possible attack includes identifying a deviation from the determined pattern of behavior for the specific storage device.

Clause 7. The method of the preceding clauses, wherein the method further includes: in response to receiving the IOC, causing the storage array to monitor a limited subset of the vectors; based on the monitoring of the limited subset of the vectors, identifying a potential sign of the possible attack; and in response to identifying the potential sign of the possible attack, triggering the monitoring of the previous snapshots.

Clause 8. A computer system comprising: one or more processors; and one or more hardware storage devices that store instructions that are executable by the one or more processors to cause the computer system to: receive, at a storage array and from a host, an indication of compromise (IOC) reflecting that the host is suspected of being compromised, wherein the IOC is received at a specific storage device included in the storage array; in response to receiving the IOC, refrain from turning on inline input/output (IO) checking of incoming IO; in lieu of turning on the inline IO checking, trigger monitoring of previous snapshots stored on the specific storage device to detect a trail of a possible attack; and provide a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second possible attack reflected by snapshots stored on the second storage array.

Clause 9. The computer system of the preceding clauses, wherein monitoring the previous snapshots is performed as a background process.

Clause 10. The computer system of the preceding clauses, wherein monitoring the previous snapshots is performed based on a designated aggressiveness level.

Clause 11. The computer system of the preceding clauses, wherein the aggressiveness level is one of a low level, a medium level, or a high level.

Clause 12. The computer system of the preceding clauses, wherein, when the high level is used, at least a select number of snapshots are monitored every select number of minutes.

Clause 13. The computer system of the preceding clauses, wherein, when the low level is used, at least one snapshot is monitored every 24 hour time period.

Clause 14. The computer system of the preceding clauses, wherein monitoring the previous snapshots is performed as an offline process.

Clause 15. The computer system of the preceding clauses, wherein detecting the trail of the possible attack using the previous snapshots includes identifying a situation in which a data change rate between snapshots deviates from an established pattern.

Clause 16. One or more hardware storage devices that store instructions that are executable by one or more processors to cause the one or more processors to: receive, at a storage array and from a host, an indication of compromise (IOC) reflecting that the host is suspected of being compromised, wherein the IOC is received at a specific storage device included in the storage array; in response to receiving the IOC, refrain from turning on inline input/output (IO) checking using all vectors in a set of vectors, including refraining from checking incoming IO; in lieu of turning on the inline IO checking, trigger monitoring of previous snapshots stored on the specific storage device to detect a trail of a possible attack; and provide a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second indication of the possible attack reflected by snapshots stored on the second storage array.

Clause 17. The one or more hardware storage devices of the preceding clauses, wherein the set of vectors includes an uncompressed data rate.

Clause 18. The one or more hardware storage devices of the preceding clauses, wherein the set of vectors includes a write IO size.

Clause 19. The one or more hardware storage devices of the preceding clauses, wherein the set of vectors includes IOCs that have been reported from the host.

Clause 20. The one or more hardware storage devices of the preceding clauses, wherein monitoring the previous snapshots includes determining a pattern of behavior for the specific storage device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, at a storage array and from a host, an indication of compromise (IOC) reflecting that the host is suspected of being compromised, wherein the IOC is received at a specific storage device included in the storage array;

in response to receiving the IOC, refraining from turning on inline input/output (IO) checking using all vectors in a set of vectors, including refraining from checking incoming IO, wherein the incoming IO continues at the storage array;

in lieu of turning on the inline IO checking, triggering monitoring of previous snapshots stored on the specific storage device to detect a trail of a possible attack; and providing a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second possible attack reflected by snapshots stored on the second storage array.

2. The method of claim 1, wherein the set of vectors includes an uncompressed data rate.

3. The method of claim 1, wherein the set of vectors includes a write IO size.

4. The method of claim 1, wherein the set of vectors includes IOCs that have been reported from the host.

5. The method of claim 1, wherein monitoring the previous snapshots includes determining a pattern of behavior for the specific storage device.

6. The method of claim 5, wherein detecting the trail of the possible attack includes identifying a deviation from the determined pattern of behavior for the specific storage device.

7. The method of claim 1, wherein the method further includes:

in response to receiving the IOC, causing the storage array to monitor a limited subset of the vectors;

based on the monitoring of the limited subset of the vectors, identifying a potential sign of the possible attack; and in response to identifying the potential sign of the possible attack, triggering the monitoring of the previous snapshots.

8. A computer system comprising:

one or more processors; and one or more hardware storage devices that store instructions that are executable by the one or more processors to cause the computer system to:

receive, at a storage array and from a host, an indication of compromise (IOC) reflecting that the host is suspected of being compromised, wherein the IOC is received at a specific storage device included in the storage array;

in response to receiving the IOC, refrain from turning on inline input/output (IO) checking of incoming IO, wherein the incoming IO continues at the storage array;

in lieu of turning on the inline IO checking, trigger monitoring of previous snapshots stored on the specific storage device to detect a trail of a possible attack; and provide a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second possible attack reflected by snapshots stored on the second storage array.

9. The computer system of claim 8, wherein monitoring the previous snapshots is performed as a background process.

10. The computer system of claim 8, wherein monitoring the previous snapshots is performed based on a designated aggressiveness level.

11. The computer system of claim 10, wherein the aggressiveness level is one of a low level, a medium level, or a high level.

12. The computer system of claim 11, wherein, when the high level is used, at least a select number of snapshots are monitored every select number of minutes.

13. The computer system of claim 11, wherein, when the low level is used, at least one snapshot is monitored every 24 hour time period.

14. The computer system of claim 8, wherein monitoring the previous snapshots is performed as an offline process.

15. The computer system of claim 8, wherein detecting the trail of the possible attack using the previous snapshots includes identifying a situation in which a data change rate between snapshots deviates from an established pattern.

16. One or more hardware storage devices that store instructions that are executable by one or more processors to cause the one or more processors to:

receive, at a storage array and from a host, an indication of compromise (IOC) reflecting that the host is suspected of being compromised, wherein the IOC is received at a specific storage device included in the storage array;

in response to receiving the IOC, refrain from turning on inline input/output (IO) checking using all vectors in a set of vectors, including refraining from checking incoming IO, wherein the incoming IO continues at the storage array;

in lieu of turning on the inline IO checking, trigger monitoring of previous snapshots stored on the specific storage device to detect a trail of a possible attack; and provide a notification to a centralized security system of the possible attack on the specific storage device, where the notification is structured to operate as a triggering mechanism to cause the centralized security system to identify a second storage array that is in communication with the host and to further cause the centralized security system to instruct the second storage array to search for a second indication of the possible attack reflected by snapshots stored on the second storage array.

17. The one or more hardware storage devices of claim 16, wherein the set of vectors includes an uncompressed data rate.

18. The one or more hardware storage devices of claim 16, wherein the set of vectors includes a write IO size.

19. The one or more hardware storage devices of claim 16, wherein the set of vectors includes IOCs that have been reported from the host.

20. The one or more hardware storage devices of claim 16, wherein monitoring the previous snapshots includes determining a pattern of behavior for the specific storage device.

\* \* \* \* \*